US006215924B1

(12) United States Patent
Hulse et al.

(10) Patent No.: US 6,215,924 B1
(45) Date of Patent: Apr. 10, 2001

(54) OPTICAL COUPLER DEVICE FOR DENSE WAVELENGTH DIVISION MULTIPLEXING

(75) Inventors: C. Andrew Hulse, Sebastopol; Robert E. Klinger, Rohnert Park; Robert B. Sargent, Santa Rosa, all of CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 09/130,137

(22) Filed: Aug. 6, 1998

(51) Int. Cl.$^7$ .................................................. G02B 6/32
(52) U.S. Cl. .................................................. 385/34; 385/35
(58) Field of Search .................................... 385/34, 35

(56) References Cited

U.S. PATENT DOCUMENTS

| | | |
|---|---|---|
| 3,829,195 | 8/1974 | Rawson . |
| 4,213,677 | 7/1980 | Sugimoto et al. . |
| 4,244,045 | 1/1981 | Nosu et al. . |
| 4,474,424 | 10/1984 | Wagner . |
| 4,479,697 | 10/1984 | Kapany et al. . |
| 4,482,994 | 11/1984 | Ishikawa . |
| 4,550,975 | 11/1985 | Levinson et al. . |
| 4,651,315 | 3/1987 | Laude . |
| 4,867,520 | 9/1989 | Weidel . |
| 5,087,109 | 2/1992 | Ishizuka et al. ................ 385/34 |
| 5,331,651 | 7/1994 | Becker et al. ................... 372/32 |
| 5,357,589 | 10/1994 | Brown, Jr. et al. .............. 385/16 |
| 5,479,547 | 12/1995 | Kunikane et al. ................ 385/47 |
| 5,539,577 | 7/1996 | Si et al. ....................... 359/629 |
| 5,583,683 | 12/1996 | Scobey . |
| 5,612,824 | 3/1997 | Si et al. ....................... 359/652 |

(List continued on next page.)

OTHER PUBLICATIONS

Nosu et al., Multireflection Optical Multi/Demultiplexer Using Interference Filters, *Electronic Letters*, vol. 15, pp. 414–415, 1979.

Atherton et al., Tunable Fabry–Perot Filters, *Optical Engineering*, vol. 20, No. 6, pp. 806–814, 1981.

Tanaka et al., Fiber–optic Multifunction Devices Using a Single GRIN–rod Lens for WDM Transmission Systems, *Applied Optics*, vol. 21, No. 19, pp. 3423–3429, 1982.

Hendricks, A Four Channel 10–Nanometer Spacing Wavelength Demultiplexer, Proc. SPIE, vol. 417, pp. 5–11, 1983.

Hendricks, Wavelength Division Multiplexing, *Fiber Optic Communication Technology*, SPIE vol. 512, pp. 130–144, 1984.

(List continued on next page.)

*Primary Examiner*—Darren Schuberg
(74) *Attorney, Agent, or Firm*—Workman, Nydegger & Seeley

(57) ABSTRACT

An optical coupler device is provided with gradient index first and second lenses, with each lens having an outer endface with one or more ports at a predetermined location defined by a waveguide such as an optical fiber. A narrow bandpass optical filter is disposed between inner endfaces of the first and second lenses. In one embodiment, the second lens is in coaxial mechanical alignment with the first lens so as to have a common optical axis. An input waveguide and an optional reflection waveguide are disposed on the outer endface of the first lens on opposite sides of the optical axis. A transmission waveguide is disposed on one side of the outer endface of the second lens and is positioned at a non-zero angle with respect to the optical axis in order to compensate for a previously unrecognized lateral beam displacement caused by the optical filter. In other embodiments, the input waveguide and optional reflection waveguide are angled, or the optical axis of the second lens is laterally offset from the optical axis of the first lens, to compensate for the lateral beam displacement and thereby improve coupling efficiency.

51 Claims, 9 Drawing Sheets

U.S. PATENT DOCUMENTS

| | | | |
|---|---|---|---|
| 5,657,155 | 8/1997 | Cheng | 359/341 |
| 5,737,104 | 4/1998 | Lee et al. . | |
| 5,790,314 | 8/1998 | Duck et al. | 359/654 |
| 5,808,763 | 9/1998 | Duck et al. . | |
| 5,850,493 | 12/1998 | Cheng | 385/34 |
| 5,991,076 | 11/1999 | Cheng | 359/495 |
| 6,014,256 | 1/2000 | Cheng | 359/495 |
| 6,014,484 * | 1/2000 | Duck et al. | 385/34 |

OTHER PUBLICATIONS

Ishio et al., Review and Status of Wavelength–Division–Multiplexing Technology and Its Application, *Journal of Lightwave Technology*, vol. LT–2, No. 4, pp. 448–463, 1984.

Lissberger and Roy, Narrowband Position–Tuned Multilayer Interference Filter for Use in Single–Mode–Fibre Systems, *Electronic Letters*, vol. 21 No. 18, pp. 798–799, 1985.

Kingslake, Lens Design Fundamentals, Academic Press, Inc., 202–205, 1978.

Khoe et al., Progress in Monomode Optical–Fiber Interconnection Devices, Journal of Lightwave Technology, vol. LT–2, No. 3, pp. 217–227, Jun. 1984.

* cited by examiner

OPTICAL COUPLER DEVICE FOR DENSE WAVELENGTH DIVISION MULTIPLEXING

BACKGROUND OF THE INVENTION

1. The Field of the Invention

The present invention is related to optical devices. In particular, the present invention relates to a fiber optic coupler device for dense wavelength division multiplexing applications.

2. The Relevant Technology

Narrowband optical filters are employed widely in the optical communications industry. One important function of such filters is in wavelength division multiplexing (WDM) systems, where they are used to combine (multiplex) or segregate (demultiplex) wavelengths in a multi-wavelength optical communication stream. A WDM system which employs optical carriers having a frequency spacing of 800 gigahertz or less is called a dense wavelength division multiplexing (DWDM) system. WDM and DWDM systems are most commonly employed in a narrow region of the near infrared optical spectrum (nominally 1500 nanometers to 1600 nanometers), where silica-based optical fiber has especially low loss, and erbium-doped fiber amplifiers (EDFAs) may be employed to periodically boost optical signals.

Optical filters which satisfy the spectral combination and segregation requirements for WDM and DWDM systems must transmit a very narrow band of light while rejecting light at nearby wavelengths. One type of DWDM system for the 1550 nanometer waveband which is becoming common employs a channel spacing of 100 gigahertz; this translates into a requirement for filters which transmit a band of light approximately ±0.2 nanometers while efficiently rejecting light ±0.6 nanometers from the center wavelength of the filter. Such filters must be centered precisely at a predetermined wavelength. This combination of requirements makes optical filters for DWDM applications difficult to build and consequently relatively expensive to manufacture.

One known technique for providing a selective narrow band optical filter is by utilizing a wavelength selective interference filter element whose wavelength characteristic depends on the angle of incidence. Thus, by varying the angle of light incident upon the interference filter, the wavelength of the light that is transmitted by the filter varies. Often, these filter elements are used in free space configurations, wherein a beam of light exiting an optical fiber or other waveguide is directed through free space into a wavelength selective interference filter element at a predetermined angle. Such configurations can be problematic. For example, positioning and affixing an optical fiber in a predetermined position and at a predetermined angle relative to a filter element can be difficult to accomplish.

Optical coupler devices have been developed which utilize two collimating gradient index (GRIN) lenses coaxially arranged with an optical interference filter disposed therebetween. Two or more ports are formed on the end faces of the coupler devices by attaching optical fibers thereto. Such a coupler device is disclosed in U.S. Pat. No. 5,612,824 to Si et al., the disclosure of which is incorporated herein by reference.

Conventional optical coupler devices can spatially segregate one or more International Telecommunications Union (ITU) wavelength channels from a multichannel optical communication stream. Such coupler devices may also be employed in a complementary configuration to combine one or more channels with a multichannel optical communication stream. During manufacture, the center wavelength of the passband of such a coupler may be adjusted by laterally translating the input and output fibers to off-axis positions along the conjugate surfaces of the collimating lenses. This results in an increased angle of incidence at the interference filter, with the filter passband shifting to a shorter wavelength. This adjustment capability relaxes the wavelength centering requirement on the filter, thereby improving the manufacturability of the coupler.

Optical couplers have been successfully deployed in a wide variety of optical systems including four-channel DWDM systems with a passband width on the order of 4 nm, and in 200 gigahertz (GHz) DWDM systems with a passband width on the order of 1 nm. A commercially available three-port coupler which has been utilized in DWDM systems is available from JDS Fitel Inc. of Nepean, Canada.

As the demand for telecommunication bandwidth has grown, so has the need for increasing the number of optical wavelengths in DWDM systems. The limited gain bandwidth of optical amplifiers translates into a need for carriers or channels more closely spaced in wavelength. Consequently, the state-of-the-art in interference filter based DWDM systems is moving from 200 to 100 GHz channel spacing. In order to transport as much information as possible through a given fiber, a 100 GHz filter must exhibit a high transmittance (T) level in the passband (T>90%), very narrow passband width (e.g., T>90% for 1549.8 nm<λ<1550.2 nm), and very steep cuton and cutoff slopes adjacent to the passband (e.g., T<0.1% for λ>1550.6 nm and for λ<1549.4 nm). It is anticipated that even narrower passband widths will be required in future systems.

Existing co-axial GRIN lens coupler designs, when used with 200 and 100 GHz channel spacings, exhibit an anomalous reduction in peak transmittance (i.e., increased insertion loss). This problem increases dramatically as the filter passband width decreases and as the angle of incidence at the filter increases. This phenomenon will be referred to hereafter as angle dependent loss.

Accordingly, there is a need for improved optical devices which overcome or avoid the above difficulty.

SUMMARY AND OBJECTS OF THE INVENTION

It is a primary object of the present invention to provide an optical coupler device which minimizes the angle dependent loss in interference-filter-based DWDM systems. A further object of the present invention is to provide a compact optical coupler device having an integrated narrow bandpass interference filter which is precisely tunable during manufacture to obtain a specific predetermined wavelength.

To achieve the foregoing objects, and in accordance with the invention as embodied and broadly described herein, the present invention provides an optical coupler device for dense wavelength division multiplexing application which is configured in various embodiments to compensate for a previously unrecognized lateral beam displacement in the interference filter and thereby improve coupling efficiency. The optical coupler device generally includes collimating first and second lenses, with two or more ports at predetermined locations defined by waveguides such as optical fibers. A narrow bandpass optical interference filter is disposed between the first and second lenses. The optical interference filter has a wavelength selective characteristic dependent upon the angle of incidence of the collimated light beam.

In one embodiment of the invention, the second lens is in coaxial mechanical alignment with the first lens so as to have a common optical axis. A first waveguide such as an optical fiber is disposed on the outer endface of the first lens on one side of the optical axis. The first waveguide defines a first port at the outer endface of the first lens for coupling a light beam into the first lens. A second waveguide is disposed on the outer endface of the second lens at a position conjugate to the first port. The second waveguide is positioned at a non-zero angle with respect to the optical axis and defines a second port at the outer endface of the second lens for coupling the transmitted light beam. An optional third waveguide may be disposed on the outer endface of the first lens on the opposite side of the optical axis from the first waveguide. This third waveguide defines another port at the outer endface of the first lens for optionally coupling the reflected light beam.

In another embodiment of the invention, the second lens is laterally offset from the first lens a predetermined distance, so that the first and second lenses have offset optical axes which are substantially parallel. The first and optional third waveguides on the outer endface of the first lens can be positioned substantially parallel to the optical axis. The second waveguide can also be positioned substantially parallel to the optical axis on the outer endface of the second lens.

In a further embodiment, the second lens is laterally offset from the first lens a predetermined distance and tilted with respect to the first lens such that the optical axis of the second lens is at a non-zero angle with respect to the optical axis of the first lens. The first and optional third waveguides on the outer endface of the first lens can be positioned substantially parallel to the optical axis of the first lens. Preferably, the second waveguide on the outer endface of the second lens is positioned substantially parallel to and coincident with the optical axis of the second lens.

In another embodiment of the invention, a four-port add/drop coupler device is provided. A first waveguide on the outer endface of the first lens provides a first input port for receiving an input multiwavelength communication stream. A second waveguide is disposed on the outer endface of the second lens at a position conjugate to the first port, and is positioned at a non-zero angle with respect to the optical axis. The second waveguide provides a drop port which contains the wavelength band of the signal which is transmitted through the filter and dropped by the coupler device. A third waveguide is disposed on the outer end face of the first lens on the opposite side of the optical axis from the first waveguide. This third wave guide provides an output port for receiving the continuing portion of the multiwavelength communication stream. A fourth waveguide is disposed on the outer endface of the second lens on the opposite side of the optical axis from the second waveguide and is positioned at a non-zero angle with respect to the optical axis so that the fourth waveguide and the second waveguide have a substantially mirror symmetry. The fourth waveguide provides an add port for launching a signal centered at a predetermined wavelength into the second lens which is identical to the wavelength band dropped and is to be added to the continuing portion of the multiwavelength communication stream.

These and other features and advantages of the invention will be better understood by reference to the detailed description, or will be appreciated by the practice of the invention.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

The present invention is directed to an optical coupler device for dense wavelength division multiplexing applications, and methods for making the coupler device. The optical coupler device of the present invention minimizes the angle dependent loss problem of prior conventional optical coupling devices, allowing for the effective use of 100 GHz (or lower) channel spacing filters in optical communication systems.

Angle dependent loss in existing co-axial lens-based coupler designs for narrowband filtering applications has been determined to result from a previously unrecognized lateral beam displacement induced by the interference coating. This lateral beam displacement is itself a result of the increased electric field in progressively narrower bandpass filters, and the non-zero angle of incidence at which the filters are employed. The effect is observable in filters suitable for applications using 200 GHz channel spacing, and becomes a significant problem in filters suitable for applications using 100 GHz and narrower channel spacing. When the magnitude of the lateral beam displacement becomes a significant fraction of the beam size in the fiber-optic coupler, the transmitted beam that emerges from the second lens of the coupler no longer propagates in a direction parallel to the input fiber. This leads to a lower coupling efficiency to the transmission port fiber, or angle dependent loss.

The precise magnitude of the interference-coating-induced lateral beam displacement for a given interference coating and angle of incidence may be determined through measurement or by calculation. Table 1 below sets forth the interference-coating-induced lateral beam displacement in the filter plane at different angles of incidence at the center of the filter passband for two optical interference filter designs. The table assumes an incident medium of refractive index 1.5, which is similar to the refractive indices of substrate and lens materials used in fiber-optic couplers. For example, a beam impinging on the representative 100 GHz filter design at a 2 degree angle of incidence exhibits a lateral beam displacement of 99 $\mu$m. This is a significant fraction of the beam diameter at the filter plane in a typical GRIN lens-based fiber optic coupler device, which is often in the range of 200 to 500 $\mu$m.

TABLE 1

| Filter Design | Channel Spacing | 0.5 dB BW (nm) | 30 dB BW (nm) | Interference-Coating-Induced Lateral Beam Displacement ($\mu$m) at Incidence Angle | | | | |
|---|---|---|---|---|---|---|---|---|
| | | | | 1° | 2° | 3° | 5° | 10° |
| Design 1 | 200 GHz | 1.10 | 2.17 | 25 | 50 | 76 | 129 | 276 |
| Design 2 | 100 GHz | 0.59 | 1.12 | 49 | 99 | 154 | 270 | 580 |

Figure 2A:
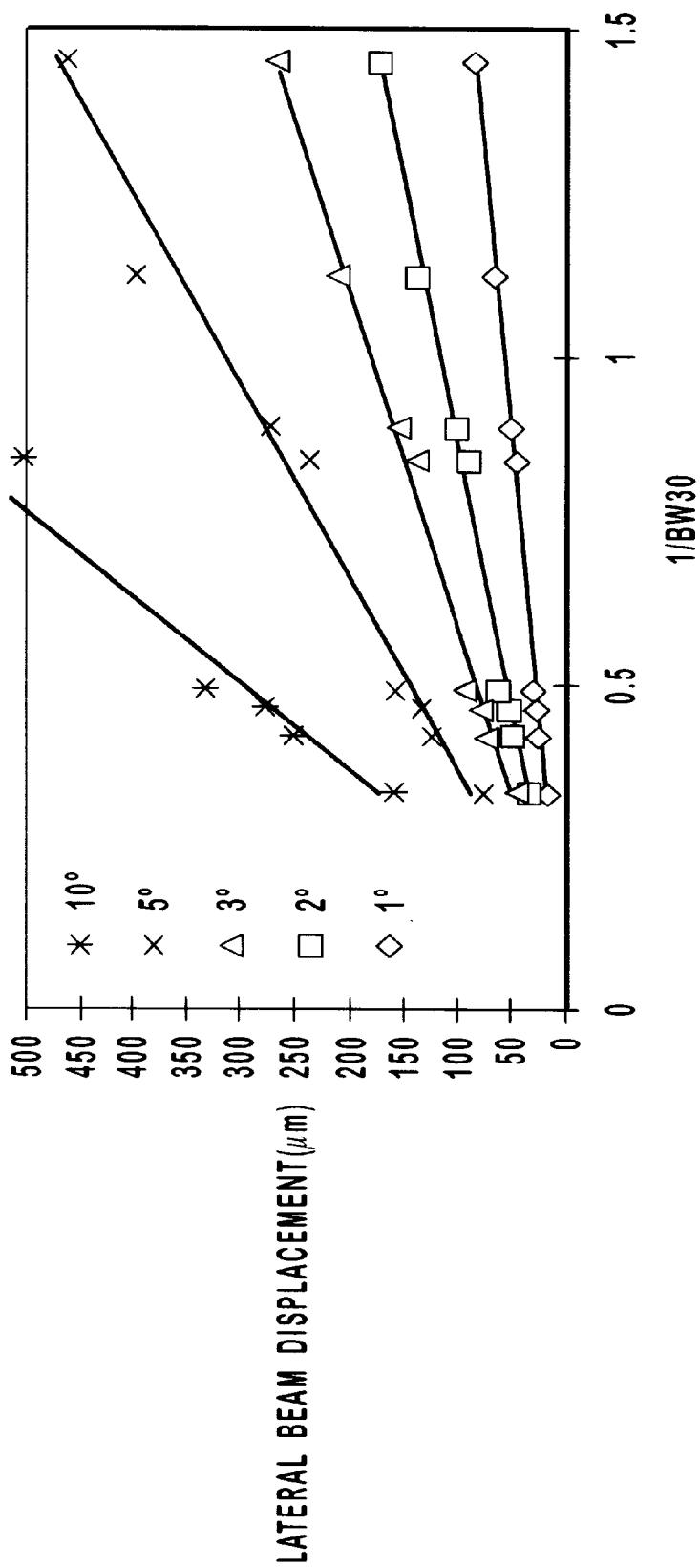
FIG. 2A is a graph showing the relationship between the lateral beam displacement induced by various interference filters and the reciprocal of the bandwidths of the filters.

FIG. 2A is a graph showing the relationship between the lateral beam displacement induced by various narrow bandpass multilayer interference filters at angles of incidence ranging from 1° to 10° and the reciprocal of the bandwidths (BW) of the filters at a transmission level of 0.1% (30 dB). The nearly linear relationship between beam displacement and reciprocal bandwidth at each angle of incidence shows that the beam displacement phenomenon shown for the two filter designs of Table 1 used in DWDM applications is present in a wide variety of narrow bandpass filters. Furthermore, the graph of FIG. 2A demonstrates that lateral beam displacement becomes more pronounced as channel spacings, and the corresponding 30 dB bandwidths of narrow bandpass filters employed in DWDM systems, are made smaller.

Figure 2B:
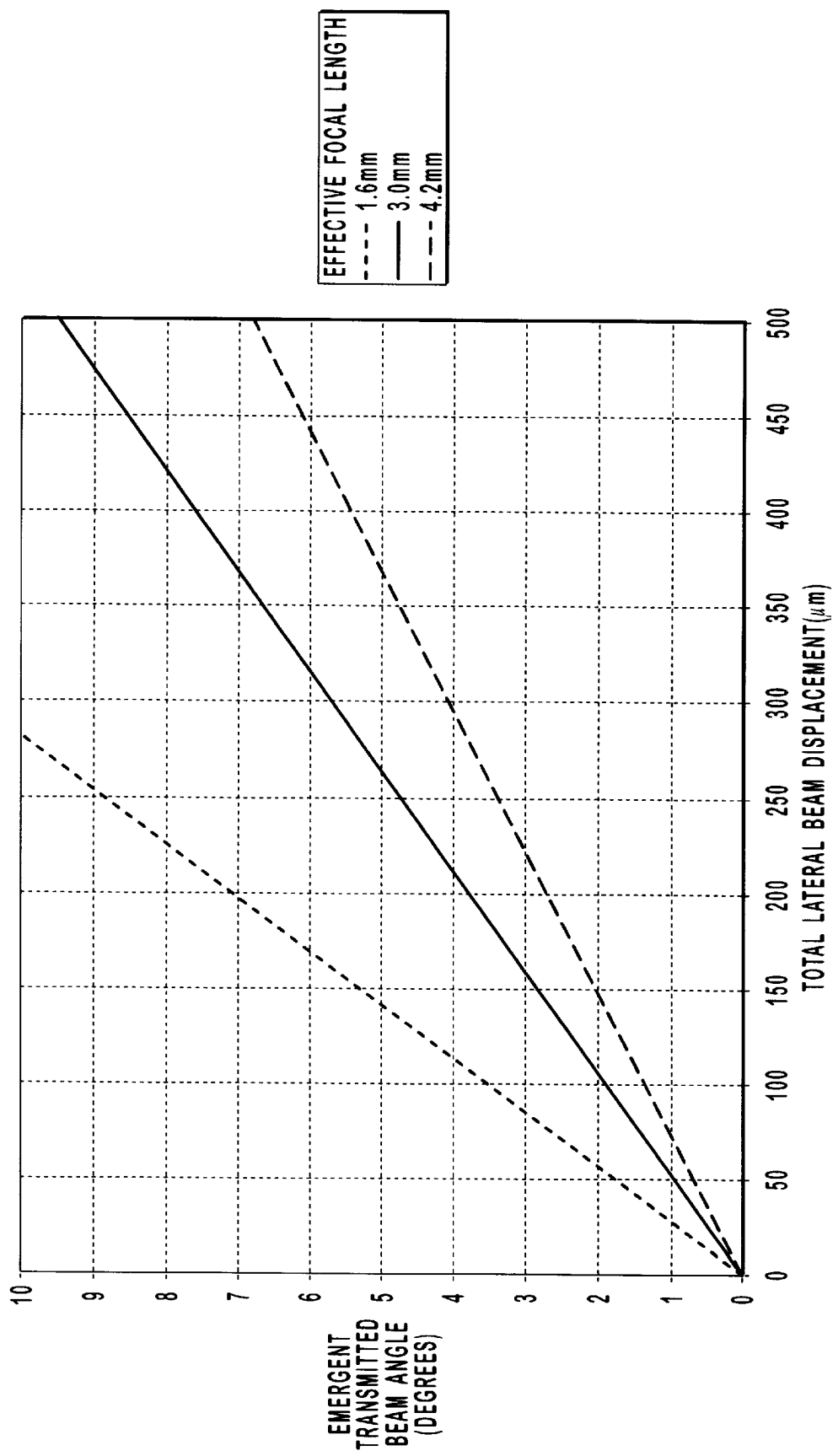
FIG. 2B is a graph showing the relationship between the emergent transmitted beam angle and the lateral beam displacement induced by the filter in the optical coupler device of the invention.

As described above, a lateral displacement of the beam in the filter plane of existing co-axial lens-based fiber-optic couplers causes the transmitted beam to emerge from the second lens in a direction which is not parallel with the input waveguide. FIG. 2B illustrates the effect of lateral beam displacement at the filter on the transmitted beam angle, or the angle of the beam emerging from the second lens of the coupler. This angle depends on the effective focal length (EFL) of the lenses employed in the coupler design; three lens examples are shown in FIG. 2B. For example, in the case of the 100 GHz filter design used in a coupler with a 2° angle of incidence employing lenses having a focal length of 3 mm, the lateral beam displacement of 99 $\mu$m induced by the interference filter causes the transmitted beam to emerge from the second lens at about 1.9°.

Figure 2C:
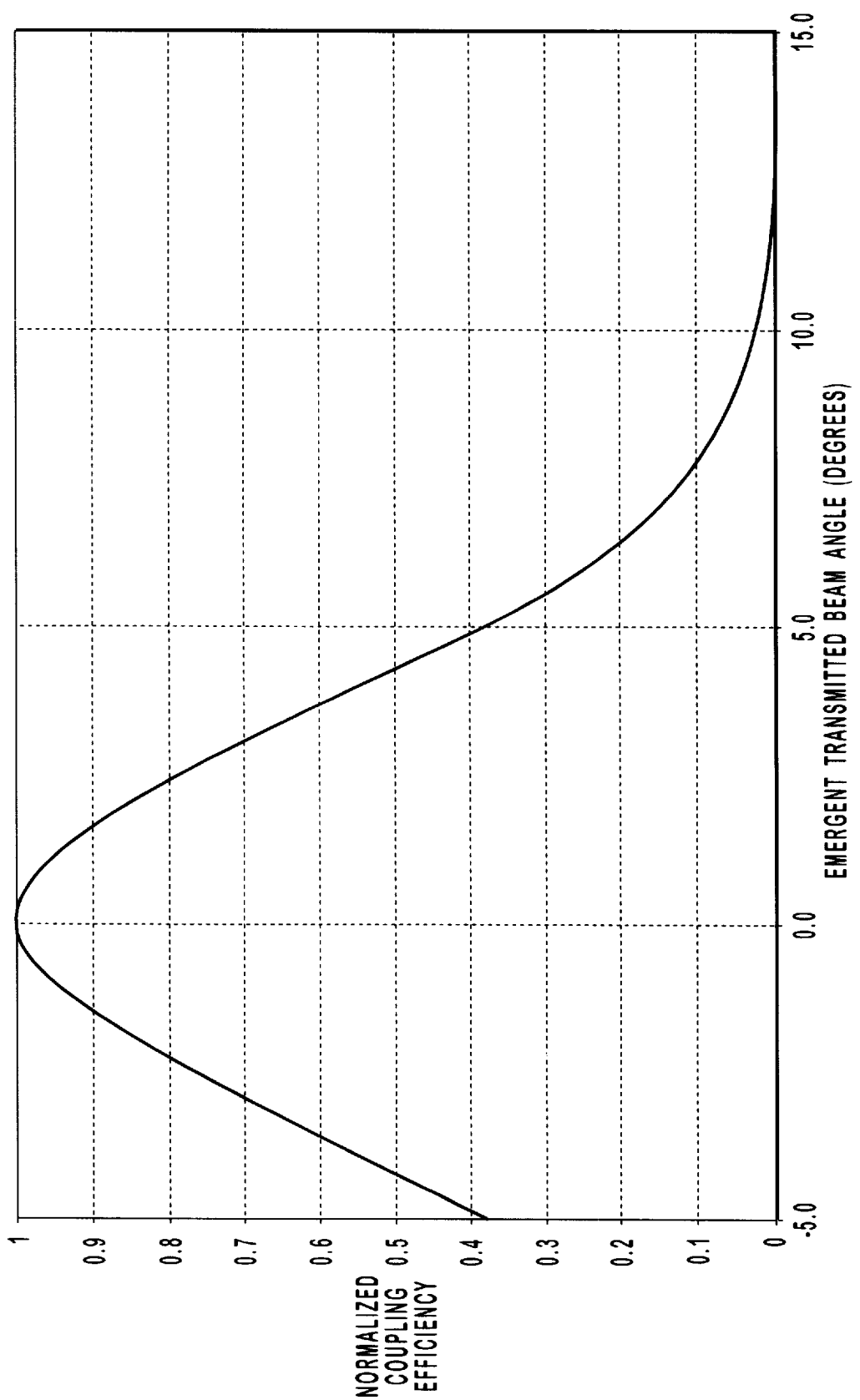
FIG. 2C is a graph showing the coupling efficiency for a conventional co-axially-aligned lens-based fiber optic coupler for various emerging transmission beam angles.

FIG. 2C illustrates the coupling efficiency which results when a typical single mode optical fiber parallel to the optical axis of a coaxial lens-based fiber-optic coupler is used to collect the transmitted beam. Specifically, the coupling efficiency is plotted as a function of the emerging beam angle. When the beam does not emerge from the second lens parallel to the optical axis of the coupler, the coupling efficiency is seen to be reduced. For the example described above, a 100 GHz filter design used at a 2° angle in a coupler employing lenses with an EFL of 3 mm, the resulting lateral beam displacement of 99 $\mu$m caused the beam to emerge from the second lens at 1.9 degrees. From FIG. 2C, it is seen that the coupling efficiency of this beam to a fiber parallel to the optical axis of the coupler is about 87%.

For optical filters which include an interference coating supported by a substrate, an additional lateral beam displacement is observed. This displacement results from the propagation of a beam through a plane parallel plate or substrate, and may be calculated as the product of the substrate thickness and the tangent of the angle of propagation through the substrate. This substrate-induced displacement is added to the previously unrecognized interference-coating-induced displacement to determine the total lateral beam displacement.

Table 2 below sets forth the lateral beam displacement induced by a substrate for several representative cases where the incident medium and substrate refractive indices are taken to be 1.5. For many coupler devices, substrate thicknesses of 1 mm or less and incidence angles of 3° or less are employed. In such cases, the additional beam displacement is only a few tens of micrometers, as indicated in Table 2. For example, if the substrate thickness is 1 mm (or 1000 $\mu$m) and the beam angle of incidence is 2 degrees, the substrate-induced lateral beam displacement is about 35 $\mu$m. For a typical lens-based coupler which employs lenses having an EFL of 3 mm, FIG. 2B indicates that such a substrate acting alone causes the transmitted beam to emerge from the second lens of the coupler at an angle of about 0.7°. Reference to FIG. 2C shows that the resulting corresponding coupling efficiency to a fiber parallel to the input port fiber is about 98%.

TABLE 2

| Substrate Thickness ($\mu$m) | Substrate-Induced Lateral Beam Displacement ($\mu$m) at Incidence Angle | | | | |
|---|---|---|---|---|---|
| | 1° | 2° | 3° | 5° | 10° |
| 500 | 9 | 17 | 26 | 44 | 88 |
| 1000 | 17 | 35 | 52 | 87 | 176 |
| 2000 | 35 | 70 | 105 | 175 | 353 |

Consider the case of a representative 100 GHz filter design supported by a substrate of 1 mm thickness, used at a 2 degree angle of incidence. From Table 1, the lateral beam displacement induced by the representative 100 GHz interference filter is 99 $\mu$m. As shown in Table 2, the lateral beam displacement induced by the substrate is about 35 $\mu$m. The total lateral beam displacement is then found to be about 134 $\mu$m. FIGS. 2B and 2C may be used to determine the transmitted beam angle and coupling efficiency resulting from this arrangement. If lenses of EFL 3 mm are used in the coupler, the transmitted beam angle will be about 2.6° and the coupling efficiency about 77%.

It has been found that angle dependent loss, or the reduction in coupling efficiency to the transmission port waveguide observed as the angle of incidence at the optical filter is increased, is unavoidable in prior optical coupler designs unless the exact coaxial alignment of the lenses and/or the parallel alignment of the fibers is altered according to the present invention. The embodiments of the optical coupler device of the present invention disclosed herein implement various design features which improve coupling and provide low loss, high performance optical coupler devices. It is to be noted that the embodiments discussed below compensate for lateral beam displacements induced by interference coatings, by propagation through a substrate, or a combination of these displacements.

Referring to the drawings, wherein like structures are provided with like reference designations, the drawings are schematic and graphical representations showing various aspects and embodiments of the present invention.

Figure 1:
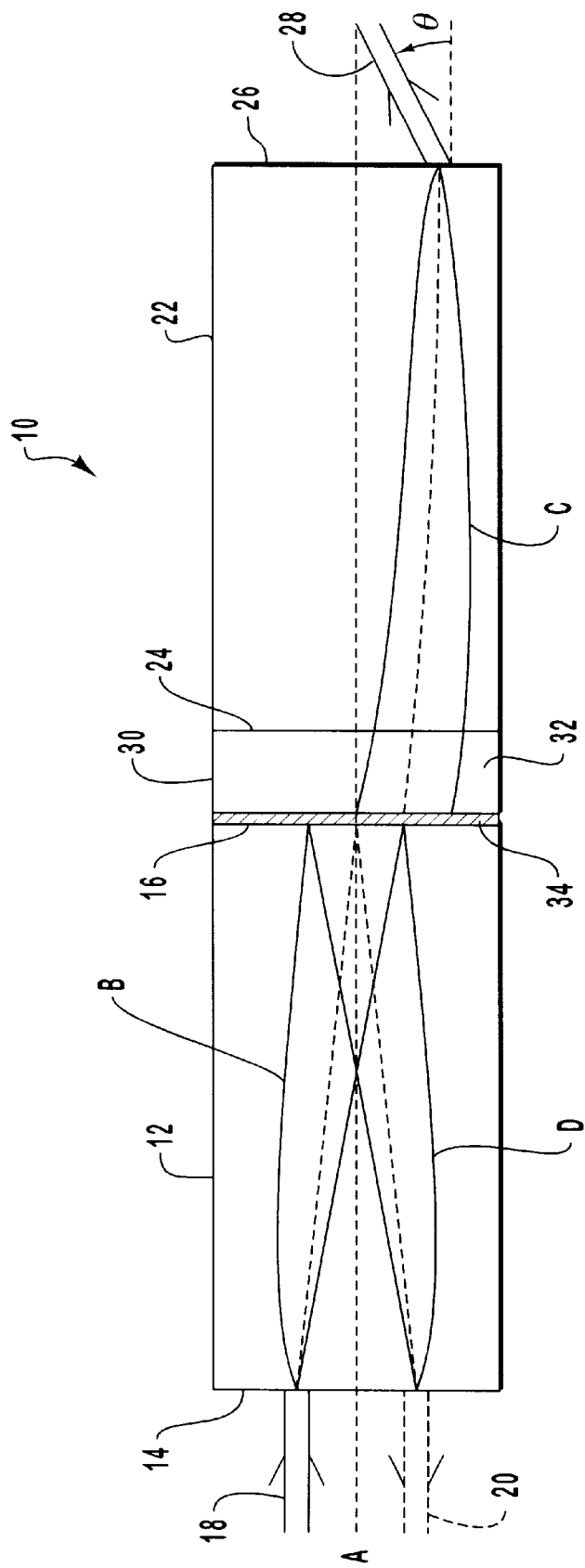
FIG. 1 is a schematic side view of an optical coupler device according to one embodiment of the present invention.

FIG. 1 depicts a three-port optical coupler device 10 according to one embodiment of the present invention. The optical coupler device 10 is provided with a first lens 12 having an outer endface 14 and an inner endface 16, with a first optical axis therethrough. The outer endface 14 acts as a focusing end for lens 12 while inner endface 16 acts as a collimating end. The first lens 12 is preferably a collimating GRIN lens such as a quarter pitch GRIN rod.

A first input waveguide 18 such as an optical fiber is disposed on outer endface 14 of first lens 12 on one side of the first optical axis. The waveguide 18 is substantially parallel to the first optical axis and defines a first input port at outer endface 14 for coupling a light beam into first lens 12. As used herein, a "port" is a point or region along the outer endface of a GRIN lens for transmitting or receiving a beam of light. A second lens 22 with a second optical axis has an inner endface 24 and an outer endface 26. The second lens 22 is in coaxial mechanical alignment with first lens 12 so that the first optical axis and the second optical axis form a common optical axis A. The outer endface 26 acts as a focusing end for lens 22 while inner endface 24 acts as a collimating end. The second lens 22 is preferably a matching GRIN lens. For example, lenses 12 and can be matching quarter pitch GRIN rods.

A second transmission waveguide 28 such as an optical fiber is disposed on outer endface 26 of second lens 22 on one side of optical axis A conjugate to the first port defined by waveguide 18. As shown in FIG. 1, waveguide 28 is positioned at a non-zero angle θ with respect to a line parallel to optical axis A and defines a second transmission port at outer endface 26 for coupling a transmitted light beam from second lens 22. As discussed in further detail below, the angular orientation of second waveguide 28 is adjusted as needed to maximize the coupling efficiency.

An optional third reflection waveguide 20 such as an optical fiber may be disposed on outer endface 14 of first lens 12 on the opposite side of optical axis A from first waveguide 18. The waveguide 20 is substantially parallel to optical axis A and defines a port at outer endface 14 for optionally coupling a reflected light beam from coupler device 10.

A wavelength selecting means such as an optical filter 30 is disposed between inner endface 16 of first lens 12 and inner endface 24 of second lens 22. The optical filter 30 includes a narrow band interference film 34 such as a multilayer interference coating. The optical filter 30 may optionally be supported by a substrate 32. The substrate 32 may have a thickness on the order of about 1 mm. As depicted in FIG. 1, inner endface 16 of first lens 12 adjoins interference film 34, while inner endface 24 of second lens 22 adjoins substrate 32 on an opposite surface from film 34. Alternatively, the optical filter 30 can be positioned such that inner endface 16 of first lens 12 adjoins substrate 32, while inner endface 24 of second lens 22 adjoins interference film 34. In addition, interference film 34 can be formed on both opposing surfaces of substrate 32. Optionally, an optical filter could be formed by applying a multilayer interference coating to inner endface 16 of first lens 12 or to inner endface 24 of second lens 22, or to both endfaces 16 and 24.

The optical filter 30 has a wavelength selective characteristic dependent upon a selected angle of incidence of a light beam exiting from first lens 12. For example, if an input beam of light comprised of multiple wavelengths is incident upon the filter at a predetermined angle, a very narrow band of wavelengths of light will be transmitted through the filter, while the other wavelengths will be reflected by the filter. The optical filter thus functions as a narrow bandpass filter, transmitting a very narrow range of wavelengths. Varying the angle of incidence varies the wavelength of light transmitted, with the filter reflecting other wavelengths outside of a very narrow band about the center wavelength.

During operation of optical coupler device 10, waveguide 18 directs a light beam, such as a signal containing a multiwavelength communication stream, through the input port at outer endface 14 into first lens 12. The light beam propagating through coupler device 10 is collimated at each of inner endfaces 16 and 24 which abut optical filter 30. As a result of the light beam being inverted by the combination of lenses 12 and 22, an input beam launched by waveguide 18 through the input port on one side of the optical axis propagates through device 10, with the portion of the beam passing through filter 30 exiting the transmission port on the other side of the optical axis after being focused by lens 22. If lenses 12 and 22 are symmetrical, it is preferred that the input port and the transmission port which are juxtaposed on either side of the optical axis be substantially equidistant from the optical axis. As shown in FIG. 1, the propagation of a light beam B through lens 12 results in the lateral displacement of a beam C passing through optical filter 30, and a reflected beam D being output through the optional reflecting port if desired. As a result of the lateral displacement, the beam C emerges from second lens 22 at a non-zero angle θ with respect to a line parallel to optical axis A. Accordingly, waveguide 28 is positioned at the non-zero angle θ by being angled toward optical axis A to achieve maximum coupling efficiency. Preferably, waveguide 28 is tilted at an angle from about 0.5 degrees to about 10 degrees with respect to a line parallel to optical axis A.

The coupler device 10 has the advantage of maintaining the simple optical/mechanical coaxial alignment configuration of the collimating lenses, while correcting for lateral beam displacement caused by the filter.

In a method for manufacturing optical coupler device 10 of the present invention, first lens 12 and second lens 22 are mechanically positioned in a coaxial arrangement with optical filter 30 disposed therebetween. The waveguide 18 is positioned on one side of optical axis A at a preselected distance from optical axis A on outer endface 14 of first lens 12. If utilized, the optional waveguide 20 is located on an opposite side of optical axis A substantially equidistant therefrom. The waveguide 28 is located on outer endface 26 of second lens 22 on the opposite side of optical axis A from waveguide 18. Polychromatic light such as white light is launched into optical coupler device 10 through the input port defined by waveguide 18 and angled by lens 12 so as to pass through filter 30 at a preselected angle before being refocused by lens 22 and received at the transmission port defined by waveguide 28. The preselected angle is determined by the location of the input port and the transmission port relative to the optical axis.

The waveguides 18 and 28 are then offset relative to the optical axis thereby changing the preselected angle until the desired center frequency is being received at the transmission port. For example, by displacing waveguides 18 and 28 such as optical fibers by a small same amount and direction, toward or away from the optical axis, the center frequency of the narrow band filter changes. As the waveguides are displaced, moving further away from the optical axis, the center wavelength of the narrow band filter decreases. As the position of the waveguides is moved toward the optical axis, the center wavelength of the filter increases.

The waveguide 28 is then precisely positioned and affixed to outer endface 26 of second lens 22 at a suitable tilt angle with respect to the optical axis in response to the filter-induced lateral beam displacement of the light beam. The waveguide 20 if used is then repositioned on outer endface 14 so as to be equidistant with waveguide 18 from the optical axis. The entire optical coupler device 10 is bound into the set position with a suitable adhesive or binder. This fixes the frequency and wavelength response of coupler device 10 to that desired.

FIG. 2B shows the angle at which the beam emerging from outer endface 26 of second lens 22 of coupler device 10 propagates, as measured from either optical axis A or the input waveguide. This angle depends on the lateral beam displacement and the EFL of the lenses employed in the coupler device, as seen by reference to FIG. 2B. Maximum coupling efficiency to the transmission port is achieved by tilting transmission waveguide to the angle at which the beam emerges.

It should be noted that if the transmission port waveguide is positioned parallel to the optical axis, but not tilted, the coupling efficiency is degraded as the optical filter induced lateral beam displacement value is increased; this effect is illustrated in FIG. 2C. For example, if a coupler which employs lenses having focal lengths of about 4.2 mm exhibits a filter-induced lateral beam displacement of 250 μm, FIG. 2B gives the emergent transmitted beam angle as 3.4°. Reference to FIG. 2C indicates that the coupling efficiency will be reduced to about 65% in such a case. If the transmission waveguide 28 is tilted to an angle of about 3.4°, the coupling efficiency to the transmission port is restored to approximately 100%.

When optical coupler device 10 is to be employed in a specific application, it is desirable to optimize the tilt angle of the transmission port waveguide prior to fabrication of the device. For example, when coupler device 10 is to be used in a 200 GHz DWDM application, an optical filter 30 including an interference film 34 having a spectral characteristic comparable to Design 1 of Table 1 and supported by a substrate 32 having a thickness of about 1 mm may be selected. The offset from optical axis A of input waveguide 18 may be adjusted to achieve a particular angle of incidence at optical filter 30 and thus tune the interference film 34 precisely to the desired wavelength. If the offset of input waveguide 18 has been adjusted to produce an incidence angle of 2° at the inner endface of first lens 12, the interference film 34 will induce a lateral beam displacement of 50 μm, as indicated in Table 1. The substrate 32 will induce an additional lateral beam displacement of 35 μm, as indicated in Table 2. For a lens-based coupler which employs lenses having an EFL of 3 mm, reference to the graph of FIG. 2B indicates that the optimum tilt angle for transmission waveguide 28 which compensates for the 85 μm total lateral beam displacement will be about 1.6°.

In a further example, if coupler device 10 is to be used in a 100 GHz application, a filter with a spectral characteristic comparable to Design 2 of Table 1, and supported by a substrate of thickness 1 mm, may be selected. At the same incidence angle of 2° the interference coating induced beam displacement will be 99 μm, as indicated in Table 1. The substrate 32 will induce an additional lateral beam displacement of 35 μm, as indicated in Table 2. For a lens-based coupler which employs lenses having an EFL of 3 mm, reference to the graph of FIG. 2B indicates that the optimum tilt angle for transmission waveguide 28 which compensates for the 134 μm total lateral beam displacement will be about 2.6°.

Figure 3A:
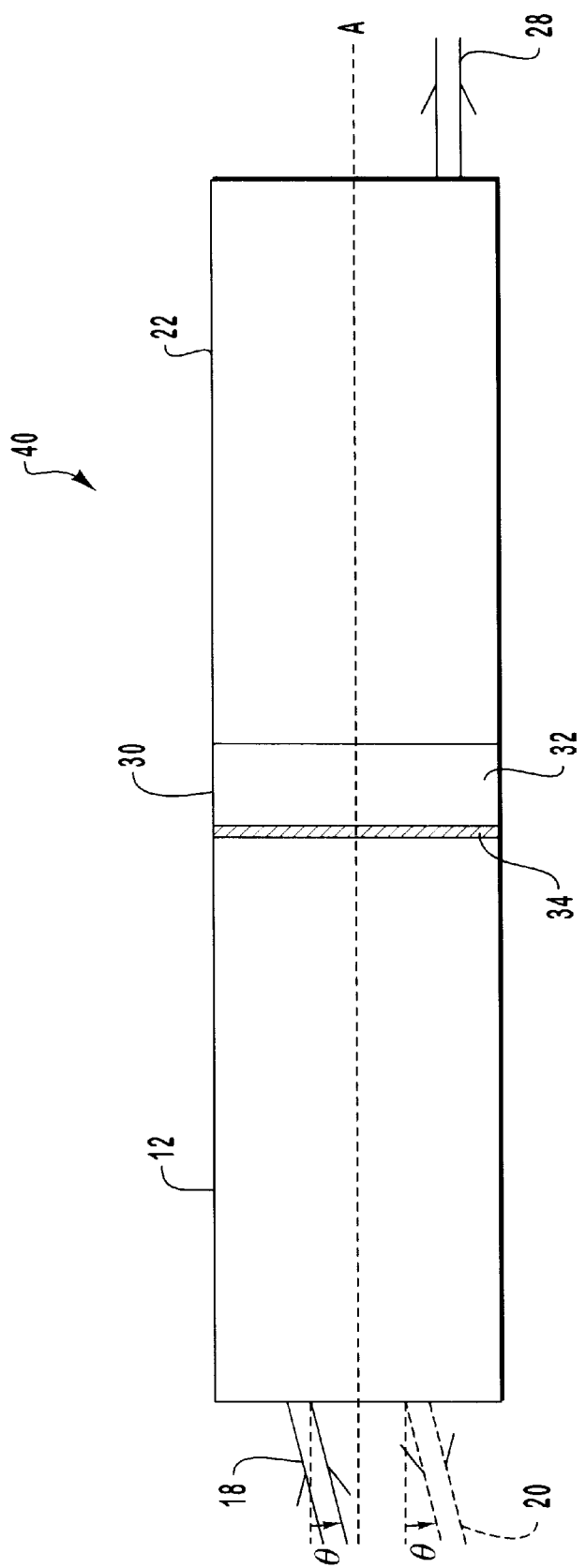
FIG. 3A is a schematic side view of an optical coupler device according to another embodiment of the present invention.

Another embodiment of the invention is depicted in FIG. 3A in the form of optical coupler device 40, which includes essentially the same components as described above for coupler device 10, except that the tilted waveguide is used for the input port when coupler device 40 is employed in an optical communication system. Accordingly, coupler device 40 includes a first lens 12 and a second lens 22, such as collimating GRIN lenses, which are aligned to have a common optical axis A. An optical filter 30 such as a narrow bandpass filter is disposed between lenses 12 and 22. A transmission waveguide 28 such as an optical fiber defining a transmission port is positioned on the outer endface of lens 22 on one side of and substantially parallel to optical axis A.

An input waveguide 18 such as an optical fiber defining an input port is disposed on the outer endface of first lens 12 on the side of optical axis A which is opposite waveguide 28. Waveguide 18 is positioned at a non-zero angle θ with respect to a line parallel to optical axis A. The angular orientation of waveguide 18 can be adjusted to compensate for the lateral beam displacement caused by filter 30 to achieve maximum coupling efficiency to the transmission waveguide 28.

An optional reflection waveguide 20 such as an optical fiber can be integrated with optical coupler device 40. The reflection waveguide 20 can be positioned on the outer endface of first lens 12 at a non-zero angle θ with respect to optical axis A on the other side thereof from waveguide 18. Waveguide 20, when used, is preferably substantially parallel to waveguide 18, as shown in FIG. 3A. The angular orientation of waveguides 20 and 18 can be adjusted to compensate for the lateral beam displacement caused by filter 30 and to achieve maximum coupling efficiency from input waveguide 18 to transmission waveguide 28, while maintaining maximum coupling efficiency from input waveguide 18 to optional reflection waveguide 20.

When optical coupler device 40 is to be employed in a specific application, it is desirable to optimize the tilt angle of the input port waveguide. For example, when coupler device 40 is to be used in a 100 GHz DWDM application, an optical filter 30 including an interference film 34 having a spectral characteristic comparable to Design 2 of Table 1 and supported by a substrate 32 having a thickness of about 1 mm may be selected. If an angle of incidence of 2° at the optical filter is selected, the lateral beam displacement resulting from the interference coating and substrate together is about 134 μm. If the coupler employs lenses having an EFL of 3 mm, the optimum tilt angle of the input waveguide 18 is about 2.6°, with the transmission waveguide 28 remaining parallel to the optical axis. Similar optimization can be accomplished for any given filter and incidence angle desired. It should be noted that polarization effects can limit the usefulness of this device at high angles of incidence.

The optical coupler device 40 operates in a similar manner and is manufactured in a similar fashion as coupler device 10 described above, with the exception that the input waveguide and optional reflection waveguide are set in an angled parallel relationship, while the transmission waveguide is set in a parallel relationship with the optical axis. The optical coupler device 40 provides the advantage of maintaining the parallelism of the axes of the collimating lenses and the transmission port waveguide.

Figure 3B:
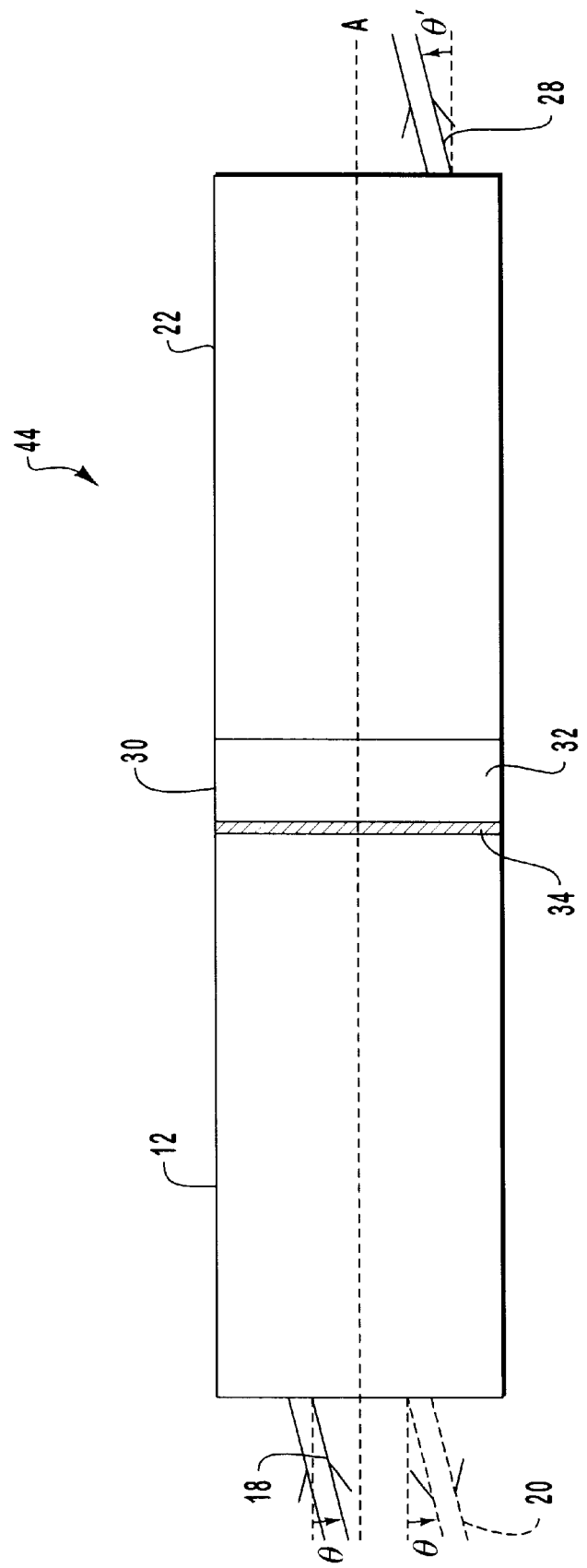
FIG. 3B is a schematic side view of an optical coupler device according to an alternative embodiment of the present invention.

FIG. 3B illustrates an alternative embodiment of an optical coupler device 44 based on a combination of features from coupler device 10 and coupler device 40 described above. Accordingly, coupler device 44 can be constructed to have both an angled input waveguide 18 and an angled transmission waveguide 28, as well as an optional reflection waveguide 20. Such a construction compensates for the lateral beam displacement caused by an optical filter 30 in coupler device 44, thereby enhancing coupling efficiency.

In further detail, coupler device 44 includes a first lens 12 and a second lens 22, such as collimating GRIN lenses, which are aligned to have a common optical axis A. An optical filter 30 such as a narrow bandpass filter is disposed between lenses 12 and 22. An input waveguide 18 such as an optical fiber defining an input port is disposed on the outer endface of first lens 12 on one side of optical axis A. Waveguide 18 is positioned at a non-zero angle θ with respect to a line parallel to optical axis A. The transmission waveguide 28 such as an optical fiber is positioned on the outer endface of lens 22 on an opposite side of optical axis A from waveguide 18. The waveguide 28 is positioned at a non-zero angle θ' with respect to a line parallel to optical axis A by being angled toward optical axis A, as shown in FIG. 3B. The angular orientation of waveguides 18 and 28 can be adjusted to compensate for the lateral beam displacement caused by filter 30 to achieve maximum coupling efficiency.

An optional reflection waveguide 20 such as an optical fiber can be positioned on the outer endface of first lens 12 at a non-zero angle θ with respect to optical axis A on the other side thereof from waveguide 18. When waveguide 20 is used, it is preferably substantially parallel to waveguide 18, with equal angular orientations, as shown in FIG. 3B.

When optical coupler device 44 is to be employed in a specific application, it is desirable to optimize the tilt angles of the input port and transmission port waveguides. For example, when coupler device 44 is to be used in a 100 GHz DWDM application, an optical filter 30 including an interference film 34 having a spectral characteristic comparable to Design 2 of Table 1 and supported by a substrate 32 having a thickness of about 1 mm may be selected. The lateral beam displacement at a 2° angle of incidence for Design 2 is about 99 µm, and the substrate-induced displacement adds another 35 µm, for a total lateral beam displacement of 134 µm. Consider the case of a lens-based coupler which employs lenses having an EFL of 3 mm. As described above, maximum coupling efficiency can be achieved if either the input waveguide 18 or the transmission waveguide 28 is tilted at an angle of about 2.6°. Tilting both the input and transmission port waveguides allows the displacement compensation to be divided between the waveguides. For example, the input waveguide could account for 53 µm of the displacement with a 1° tilt, and the remaining 81 µm of displacement would be compensated for by tilting the transmission waveguide approximately 1.6°. Similar optimization can be accomplished for any given filter to find a desired combination of tilt angles. As mentioned above, polarization effects can limit the usefulness of this device at high angles of incidence.

The optical coupler device 44 operates in a similar manner and is manufactured in a similar fashion as coupler device 10 described above, with the exception that the input port waveguide and the transmission port waveguide are set in an angled relationship. The optional reflection port waveguide, if used, is preferably positioned substantially parallel to the input port waveguide.

Figure 4:
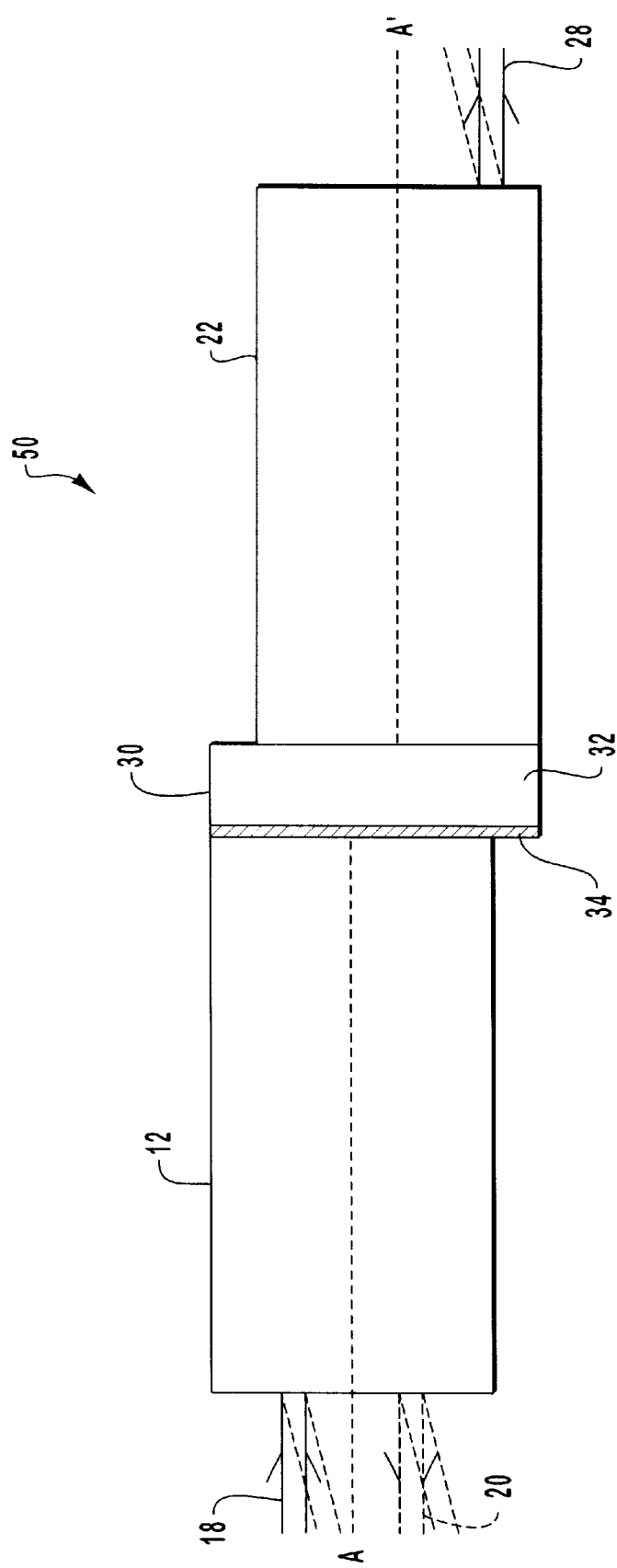
FIG. 4 is a schematic side view of an optical coupler device according to another embodiment of the present invention.

A further embodiment of the invention is depicted in FIG. 4 in the form of optical coupler device 50, which includes similar components as described above for coupler device 10. Accordingly, coupler device 50 includes a first lens 12 and a second lens 22 such as collimating GRIN lenses, with an optical filter 30 such as a narrow bandpass filter disposed therebetween.

As shown in FIG. 4, second lens 22 is translated and laterally offset from first lens 12 by a predetermined distance. As a result, lens 12 has a first optical axis A which is offset from a second optical axis A' of lens 22, with optical axes A and A' being substantially parallel. This axial offset of the collimating lenses is adjusted to counteract the lateral beam displacement which results from the propagation of a light beam through optical filter 30. Thus, the optical axis of the second lens is laterally shifted with respect to the first lens by the amount of the filter induced beam displacement.

An input waveguide 18 and an optional reflection waveguide 20 are positioned on opposite sides of optical axis A on the outer endface of lens 12 and are substantially parallel to optical axis A. A transmission waveguide 28 is positioned on the other side of the outer endface of lens 22 opposite from waveguide 18 so as to be substantially parallel to optical axis A'. Alternatively, the waveguides can be positioned in an angled relationship with respect to the optical axes as shown in the phantom lines of FIG. 4.

When optical coupler device 50 is to be employed in a specific application, it is desirable to optimize the axial offset of the lenses prior to fabrication. For example, when coupler device 50 is to be used in a 100 GHz DWDM application, an optical filter 30 including an interference film 34 having a spectral characteristic comparable to Design 2 of Table 1 and supported by a substrate 32 having a thickness of about 1 mm may be selected. If an angle of incidence of 2° at the optical filter is selected, the lateral beam displacement resulting from the interference coating and substrate together is about 134 µm. The lenses of coupler device 50 must therefore be laterally offset from one another so that the offset between optical axes A and A' is about 134 µm. Similar optimization can be accomplished for any given filter and incidence angle desired, provided the optical filter performs adequately at the necessary angle of incidence.

The optical coupler device 50 operates in a similar manner and is manufactured in a similar fashion as coupler device 10 described above, with the exception that the collimating lenses are axially offset from each other so as to be in a parallel translational alignment, while the port waveguides are all set in a parallel relationship with the optical axes of the lenses. The optical coupler device 50 provides the advantage of maintaining the overall parallelism of the port waveguides and the lens axes.

Figure 5:
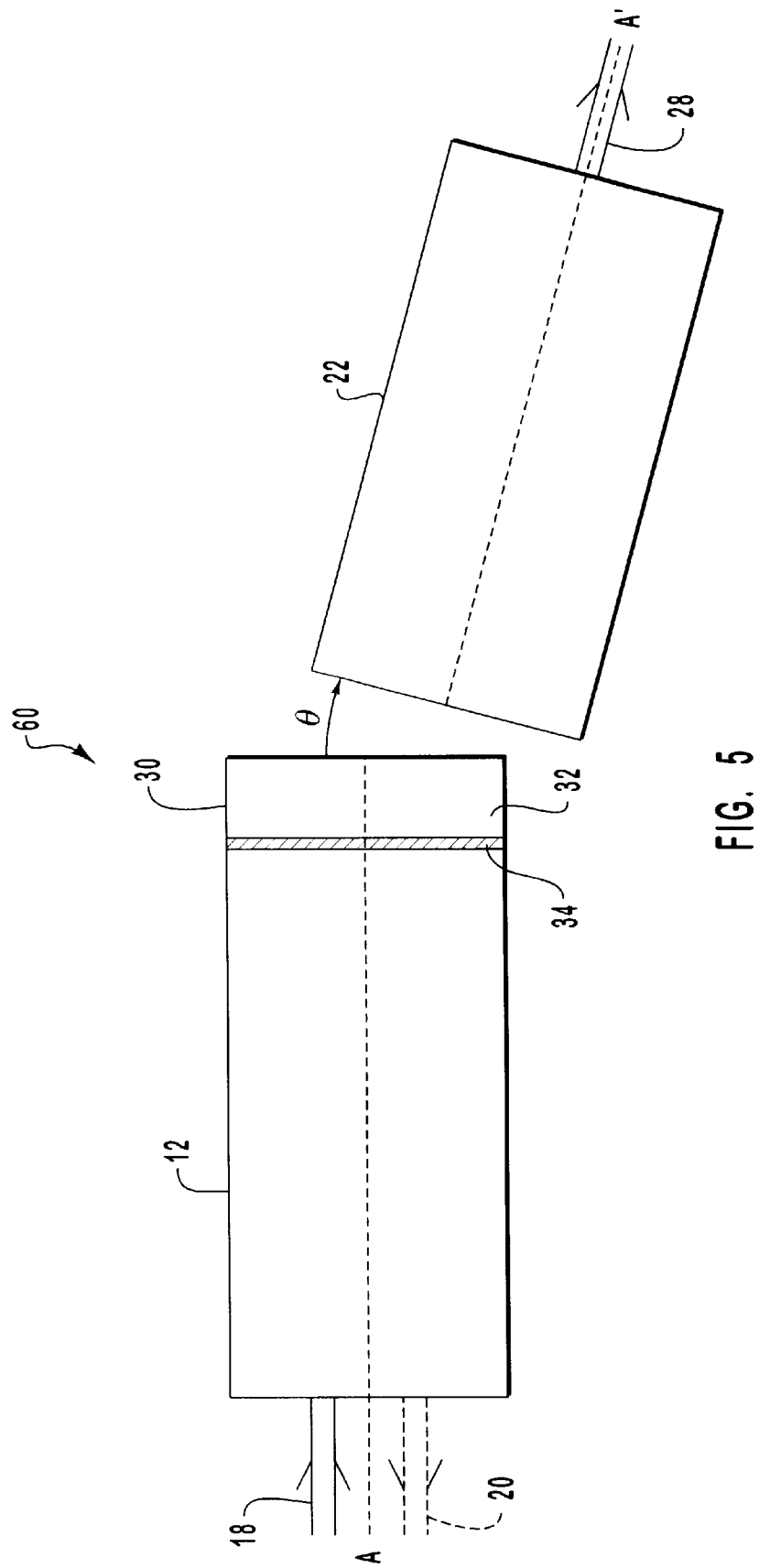
FIG. 5 is a schematic side view of an optical coupler device according to another embodiment of the present invention.

A further embodiment of the invention is depicted in FIG. 5 in the form of optical coupler device 60, which includes similar components as described above for coupler device 10. Accordingly, coupler device 60 includes a first lens 12 and a second lens 22 such as collimating GRIN lenses, with a wavelength-selecting means such as an optical filter 30 disposed therebetween. The optical filter 30 preferably includes a narrowband interference filter 34 optionally supported on a substrate 32.

An input waveguide 18 and an optional reflection waveguide 20 are positioned on opposite sides of an optical axis A on the outer endface of lens 12 and are substantially parallel to optical axis A.

As shown in FIG. 5, second lens 22 is laterally offset a predetermined distance and positioned at an angle θ with respect to first lens 12 and filter 30 by being axially translated and tilted such that an optical axis A' of second lens 22 is at a non-zero angle with respect to an optical axis A of first lens 12. The axial offset of second lens 22 of coupler device 60 is adjusted as needed to counteract the lateral beam displacement which results from the propagation of a light beam through optical filter 30. Thus, optical axis A' of second lens 22 is laterally shifted with respect to optical axis A of first lens 12 by the amount of the filter induced beam displacement. The tilt angle θ of lens 22 is adjusted to match the angle of incidence of the light beam at optical filter 34, forming a transmission port which is preferably centered on the outer endface of second lens 22. The combined effects of lens offset and tilt allow a transmission waveguide 28 to be positioned on the outer endface of lens 22 so as to be substantially parallel to and coincident with optical axis A' of lens 22. Thus, all optical waveguides in coupler device 60 are aligned parallel to the respective optical axis of the lens associated with each waveguide.

The optical coupler device 60 operates in a similar manner and is manufactured in a similar fashion as coupler device 10 described above, with the exception that the second collimating lens is axially offset and tilted at an angle with respect to the first lens, with the port waveguides set in a parallel relationship with the optical axes of the lenses. The second lens can be tilted and fixed in position so there is an air gap between the filter substrate and the second lens, or a wedge of translucent or transparent material can be placed in the gap formed by the tilted second lens. The optical coupler device 60 provides the advantages of maintaining the parallelism of the port waveguides with the associated lens axes and allowing the transmission waveguide to be coincident with optical axis A' of second lens 22.

Figure 6:
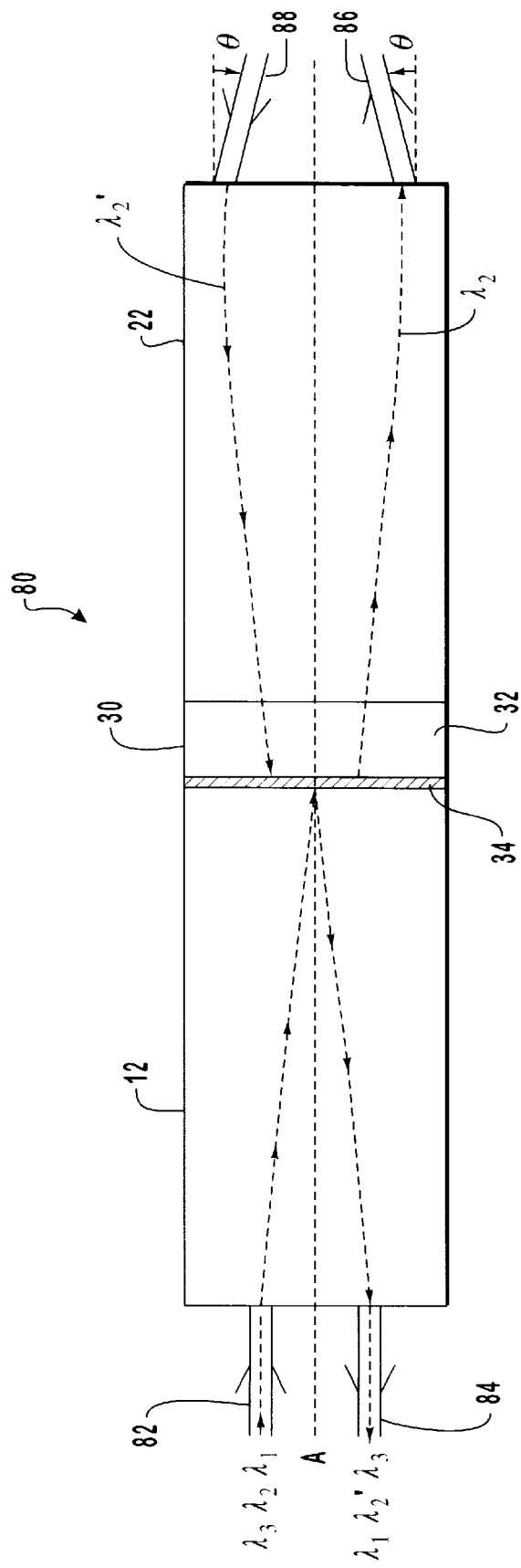
FIG. 6 is a schematic side view of an optical coupler device according to a further embodiment of the present invention.

A further embodiment of the invention is depicted in FIG. 6 in the form of optical coupler device 80, which is a four-port add/drop device similar to coupler device 10 of FIG. 1 except for the incorporation of an additional port. Accordingly, coupler device 80 includes a first lens 12 and a second lens 22, such as collimating GRIN lenses. The first lens 12 and second lens 22 are aligned to have a common optical axis A, and an optical filter 30 such as a narrow bandpass filter is disposed therebetween.

A first waveguide 82 such as an optical fiber is disposed on the outer endface of first lens 12 on one side of optical axis A. The first waveguide 82 defines an input port at the outer endface of first lens 12 for receiving an incoming multiwavelength communication stream.

A second waveguide 86 such as an optical fiber is disposed on the outer endface of second lens 22 on one side of optical axis A, with waveguide 86 positioned at a non-zero angle θ with respect to a line parallel to optical axis A. The waveguide 86 defines a drop channel port at the outer endface of second lens 22 for receiving a wavelength band of the signal which is transmitted through filter 30 and therefore dropped by coupler device 80.

A third waveguide 84 such as an optical fiber is disposed on the outer endface of first lens 12 on an opposite side of optical axis A from first waveguide 82. The waveguide 84 defines an output port at the outer endface of first lens 12 for receiving a continuing portion of the multiwavelength communication stream to be output from coupler device 80. The waveguides 82 and 84 are substantially parallel to optical axis A as shown in FIG. 6.

A fourth waveguide 88 such as an optical fiber is disposed on the outer endface of second lens 22 on an opposite side of optical axis A from second waveguide 86, with waveguide 88 positioned at a non-zero angle θ with respect to a line parallel to optical axis A. The waveguide 88 defines an add channel port at the outer endface of second lens 22 for launching a signal centered at a predetermined wavelength into second lens 22. The wavelength of the added signal is identical to the wavelength of the dropped signal and is to be added to the continuing portion of the multiwavelength communication stream. Preferably, waveguides 86 and 88 are each tilted toward optical axis A so as to have an angled substantially mirror symmetry relationship with respect to optical axis A, thereby having equal but opposite angular orientations, as shown in FIG. 6.

Both waveguides 86 and 88 are tilted to correct for the filter-induced lateral displacement introduced into the beams carried by each waveguide. The angular orientation of waveguides 86 and 88 is adjusted as needed to compensate for the lateral beam displacement caused by the filter and to achieve maximum coupling efficiency.

The optical coupler device 80 is fabricated in a similar manner as described for coupler device 10, with the exception that a fourth port waveguide is added to the second lens as described above. The construction of optical coupler device 80 for a specific application may be illustrated by the following examples.

If optical coupler device 80 is to be used in a 200 GHz DWDM application, an optical filter 30 including an interference film 34 having a spectral characteristic comparable to Design 1 of Table 1, and supported by a substrate 32 having a thickness of about 1 mm, may be selected. The offset from optical axis A of input waveguide 82 may be adjusted to achieve a particular angle of incidence at optical filter 30 and thus tune the multilayer interference film 34 precisely to the desired wavelength. If the offset of input waveguide 82 has been adjusted to produce an incidence angle of 2° at interference film 34, the beam emerging from optical filter 30 will be displaced by about 85 μm as a result of the combined effects of the interference coating and the substrate. Referring to the graph of FIG. 2B, for a lens-based fiber-optic coupler which employs lenses having an EFL of 3 mm, the optimum tilt angle for the drop channel waveguide 86 will be about 1.6 degrees. By symmetry, for the same coupler, the optimum angle for the add channel waveguide 88 is about −1.6°.

In a further example, if coupler device 80 is to be used in a 100 GHz DWDM application, an optical filter 30 including an interference film 34 having a spectral characteristic comparable to Design 2 of Table 1, and supported by a substrate 32 having a thickness of about 1 mm, may be selected. At the same incidence angle of 2°, the beam will be displaced by 134 μm as a result of the combined effects of the interference coating and the substrate. For a lens-based fiber-optic coupler which employs lenses having an EFL of 3 mm, FIG. 2B shows that the optimum tilt angles of the drop and add channel waveguides are about 2.6 and −2.6°, respectively. Similar optimization may be accomplished for any given filter and incidence angle desired.

During operation of coupler device 80, waveguide 82 contains an incoming multiwavelength communication stream such as a signal including wavelengths $\lambda_1$, $\lambda_2$, and $\lambda_3$, as shown in FIG. 6. The waveguide 86 contains the wavelength band $\lambda_2$ which is dropped by the device by being transmitted through the interference filter 34. The waveguide 88 is used to insert a communications signal onto the continuing communication stream which is of the same wavelength as the signal which is dropped. Thus, the add port defined by waveguide 88 is used to direct a wavelength band $\lambda_2'$, which is identical to the wavelength band $\lambda_2$ dropped, into the device for addition to the continuing portion of the multiwavelength communication stream. The waveguide 88 is tilted to maximize coupling efficiency to the output port defined by waveguide 84 because the add port signal is transmitted through and laterally displaced by filter 30. The waveguide 84 contains the continuing portion of the multiwavelength communication stream, including that portion reflected by filter 30 such as wavelength bands $\lambda_1$ and $\lambda_3$, plus the wavelength band $\lambda_2'$ which is inserted at the add port defined by waveguide 88.

The present invention provides an optical coupler device with many benefits and advantages. The optical coupler device utilizes an integrated narrow bandpass filter which is tunable to obtain a certain predetermined wavelength, while minimizing angle dependent loss in optical filters with narrow channel spacings, such as 100 GHz or less. Further, the optical coupler device is compact and can be centered at a predetermined frequency within very small predetermined limits.

The present invention may be embodied in other specific forms without departing from its spirit or essential characteristics. Notably, unique aspects of individual embodiments as described above may be combined in a single device. For example, various combinations of port waveguide tilt and lens axis offset may be utilized for a desired application. As another example, materials with different refractive indices such as high-index glass or air may be incorporated into the coupler device of the invention through the application of well known practices.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An optical coupler device, comprising:
   a first lens having an outer endface and an inner endface with a first optical axis therethrough;
   a first waveguide on the outer endface of the first lens on one side of the first optical axis;
   a second lens having an outer endface and an inner endface with a second optical axis therethrough, the second lens in coaxial alignment with the first lens so that the first optical axis and the second optical axis form a common optical axis;
   a second waveguide on the outer endface of the second lens on one side of the second optical axis, the second waveguide positioned at a non-zero angle with respect to the second optical axis; and
   a narrow bandpass optical filter disposed between the inner endface of the first lens and the inner endface of the second lens, the optical filter having channel spacings of about 100 GHz or less;
   wherein the optical coupler device minimizes angle dependent loss in the optical filter.

2. The optical coupler device of claim 1, wherein the first and second lenses are collimating gradient index lenses.

3. The optical coupler device of claim 1, wherein the first and second waveguides are optical fibers.

4. The optical coupler device of claim 1, wherein the second waveguide is angled inwardly from the outer endface of the second lens toward the second optical axis.

5. The optical coupler device of claim 4, wherein the second waveguide is tilted at an angle of about 0.5 degrees to about 10 degrees with respect to a line parallel to the second optical axis.

6. The optical coupler device of claim 1, wherein the optical filter includes a substrate and a multilayer interference coating formed thereon.

7. The optical coupler device of claim 6, wherein the inner endface of the first lens abuts the multilayer interference coating, and the inner endface of the second lens abuts an opposite surface of the substrate.

8. The optical coupler device of claim 1, wherein the first waveguide is substantially parallel to the first optical axis.

9. The optical coupler device of claim 1, wherein the first waveguide is positioned at a non-zero angle with respect to the first optical axis.

10. The optical coupler device of claim 1, further comprising a third waveguide on the outer endface of the first lens on an opposite side of the first optical axis from the first waveguide.

11. The optical coupler device of claim 10, wherein the first and third waveguides are substantially parallel to the first optical axis.

12. The optical coupler device of claim 10, wherein the first waveguide is positioned at a non-zero angle with respect to the first optical axis.

13. The optical coupler device of claim 12, wherein the third waveguide is positioned at a non-zero angle with respect to the first optical axis so that the third waveguide and the first waveguide are substantially parallel.

14. The optical coupler device of claim 10, further comprising a fourth waveguide on the outer endface of the second lens on an opposite side of the second optical axis from the second waveguide, the fourth waveguide positioned at a non-zero angle with respect to the second optical axis.

15. The optical coupler device of claim 14, wherein the fourth waveguide is angled inwardly from the outer endface of the second lens toward the second optical axis so that the fourth waveguide and the second waveguide have a substantially mirror symmetry.

16. The optical coupler device of claim 14, wherein the first and third waveguides are substantially parallel to the first optical axis.

17. The optical coupler device of claim 1, further comprising a third waveguide on the outer endface of the second lens on an opposite side of the second optical axis from the second waveguide.

18. The optical coupler device of claim 17, wherein the third waveguide is positioned at a non-zero angle with respect to the second optical axis so that the third waveguide and the second waveguide are substantially parallel.

19. An optical coupler device, comprising:
   a first lens having an outer endface and an inner endface with a first optical axis therethrough;
   a first waveguide on the outer endface of the first lens on one side of the first optical axis, the first waveguide positioned at a non-zero angle with respect to the first optical axis, the first waveguide defining a first port at the outer endface of the first lens for inputting a light beam into the first lens;
   a second lens having an outer endface and an inner endface with a second optical axis therethrough, the second lens in coaxial alignment with the first lens so that the first optical axis and the second optical axis form a common optical axis;
   a second waveguide on the outer endface of the second lens on one side of the second optical axis, the second waveguide defining a second port at the outer endface of the second lens for transmitting a light beam from the second lens; and a narrow bandpass optical filter disposed between the inner endface of the first lens and the inner endface of the second lens, the optical filter having channel spacings of about 100 GHz or less and a wavelength selective characteristic dependent upon an angle of incidence of the light beam in the first lens;

wherein the optical coupler device minimizes angle dependent loss of the light beam propagating through the optical filter.

20. The optical coupler device of claim 19, wherein the first and second lenses are collimating gradient index lenses.

21. The optical coupler device of claim 19, wherein the first and second waveguides are optical fibers.

22. The optical coupler device of claim 19, further comprising a third waveguide on the outer endface of the first lens on an opposite side of the first optical axis from the first waveguide, the third waveguide defining a third port at the outer endface of the first lens for coupling a reflected light beam from the first lens.

23. The optical coupler device of claim 22, wherein the third waveguide is positioned at a non-zero angle with respect to the first optical axis so that the third waveguide and the first waveguide are substantially parallel.

24. The optical coupler device of claim 23, wherein the second waveguide is substantially parallel to the second optical axis.

25. An optical coupler device, comprising:

a collimating gradient index first lens having an outer endface and an inner endface with a first optical axis therethrough;

a first waveguide disposed on the outer endface of the first lens on one side of the first optical axis, the first waveguide defining a first port at the outer endface of the first lens for receiving an input multiwavelength communication stream;

a collimating gradient index second lens having an outer endface and an inner endface with a second optical axis therethrough, the second lens in coaxial alignment with the first lens so that the first optical axis and the second optical axis form a common optical axis;

a second waveguide disposed on the outer endface of the second lens on one side of the second optical axis, the second waveguide positioned at a non-zero angle with respect to the second optical axis and defining a second port at the outer endface of the second lens for receiving a signal wavelength band to be dropped by the coupler device;

a third waveguide disposed on the outer endface of the first lens on an opposite side of the first optical axis from the first waveguide, the third waveguide defining a third port at the outer endface of the first lens for receiving an output continuing portion of the multi-wavelength communication stream;

a fourth waveguide disposed on the outer endface of the second lens on an opposite side of the second optical axis from the second waveguide, the fourth waveguide positioned at a non-zero angle with respect to the second optical axis and defining a fourth port at the outer endface of the second lens for launching a signal centered at a predetermined wavelength into the second lens which is to be added to the continuing portion of the multiwavelength communication stream; and a narrow bandpass optical interference filter disposed between the inner endface of the first lens and the inner endface of the second lens, the optical filter having channel spacings of about 100 GHz or less.

26. The optical coupler device of claim 25, wherein the second and fourth waveguides are angled inwardly from the outer endface of the second lens toward the second optical axis and have a substantially mirror symmetry.

27. The optical coupler device of claim 25, wherein the first and third waveguides are substantially parallel to the first optical axis.

28. An optical coupler device, comprising:

a first lens having an outer endface and an inner endface with a first optical axis therethrough;

a first waveguide on the outer endface of the first lens on one side of the first optical axis;

a second lens having an outer endface and an inner endface with a second optical axis therethrough, the second lens having substantially the same length as the first lens and translationally positioned with respect to the first lens such that the second optical axis is laterally offset from the first optical axis a predetermined distance, with the second optical axis being substantially parallel to the first optical axis;

a second waveguide on the outer endface of the second lens on one side of the second optical axis; and an optical filter disposed between and abutting the inner endface of the first lens and the inner endface of the second lens.

29. The optical coupler device of claim 28, wherein the first and second lenses are collimating gradient index lenses.

30. The optical coupler device of claim 28, wherein the first and second waveguides are optical fibers.

31. The optical coupler device of claim 28, wherein the optical filter is a narrow bandpass interference filter.

32. The optical coupler device of claim 28, further comprising a third waveguide on the outer endface of the first lens on an opposite side of the first optical axis from the first waveguide.

33. The optical coupler device of claim 32, wherein one or more of the first, second and third waveguides are tilted at a non-zero angle with respect to the first or second optical axes.

34. An optical coupler device, comprising:

a first lens having an outer endface and an inner endface with a first optical axis therethrough;

a first waveguide on the outer endface of the first lens on one side of the first optical axis, the first waveguide defining a first port at the outer endface of the first lens for inputting a light beam into the first lens;

a second lens having an outer endface and an inner endface with a second optical axis therethrough, the second lens laterally offset from the first lens a predetermined distance and tilted with respect to the first lens such that the second optical axis is at a non-zero angle with respect to the first optical axis;

a second waveguide disposed on the outer endface of the second lens and coincident with the second optical axis, the second waveguide defining a second port at the outer endface of the second lens for transmitting a light beam from the second lens; and an optical filter disposed between the first lens and the second lens, the optical filter having a wavelength selective characteristic dependent upon an angle of incidence of the light beam in the first lens.

35. The optical coupler device of claim 34, wherein the first and second lenses are collimating gradient index lenses.

36. The optical coupler device of claim 34, wherein the first and second waveguides are optical fibers.

37. The optical coupler device of claim 34, wherein the optical filter is a narrow bandpass interference filter.

38. The optical coupler device of claim 34, further comprising a third waveguide disposed on the outer endface of the first lens on an opposite side of the first optical axis from the first waveguide, the third waveguide defining a third port at the outer endface of the first lens for coupling a reflected light beam from the first lens.

39. A method of fabricating an optical coupler device, comprising the steps of:
   providing a first lens having an outer endface and an inner endface with a first optical axis therethrough;
   providing a second lens having an outer endface and an inner endface with a second optical axis therethrough;
   positioning the first and second lenses in a coaxial relationship such that the first optical axis and the second optical axis form a common optical axis;
   positioning a narrow bandpass optical filter between the inner endface of the first lens and the inner endface of the second lens, the optical filter having channel spacings of about 100 GHz or less;
   affixing a first waveguide to the outer endface of the first lens on one side of the first optical axis; and
   affixing a second waveguide to the outer endface of the second lens on one side of the second optical axis at a non-zero angle with respect to the second optical axis.

40. The method of claim 39, further comprising the step of affixing a third waveguide to the outer endface of the first lens on an opposite side of the first optical axis from the first waveguide.

41. The method of claim 39, further comprising the step of affixing a third waveguide to the outer endface of the second lens on an opposite side of the second optical axis from the second waveguide.

42. The method of claim 40 further comprising the step of affixing a fourth waveguide on the outer endface of the second lens on an opposite side of the second optical axis from the second waveguide, the fourth waveguide positioned at a non-zero angle with respect to the second optical axis.

43. A method of fabricating an optical coupler device, comprising the steps of:
   providing a first lens having an outer endface and an inner endface with a first optical axis therethrough;
   providing a second lens having an outer endface and an inner endface with a second optical axis therethrough, the second lens having substantially, the same length as the first lens;
   positioning the first and second lenses in an offsetting translational relationship such that the second optical axis is laterally offset from the first optical axis a predetermined distance, with the second optical axis being substantially parallel to the first optical axis;
   positioning an optical filter between the first lens and the second lens such that the optical filter abuts the inner endface of the first lens and the inner endface of the second lens;
   affixing a first waveguide to the outer endface of the first lens on one side of the first optical axis; and
   affixing a second waveguide to the outer endface of the second lens on one side of the second optical axis.

44. The method of claim 43, further comprising the step of affixing a third waveguide to the outer endface of the first lens on an opposite side of the first optical axis from the first waveguide.

45. A method of fabricating an optical coupler device, comprising the steps of:
   providing a first lens having an outer endface and an inner endface with a first optical axis therethrough;
   providing a second lens having an outer endface and an inner endface with a second optical axis therethrough;
   positioning the first and second lenses in an offsetting translational and tilted relationship such that the second lens is laterally offset from the first lens a predetermined distance, with the second optical axis at a non-zero angle with respect to the first optical axis;
   positioning an optical filter between the inner endface of the first lens and the inner endface of the second lens;
   affixing a first waveguide to the outer endface of the first lens on one side of the first optical axis; and
   affixing a second waveguide to the outer endface of the second lens such that the second waveguide is coincident with the second optical axis.

46. The method of claim 45, further comprising the step of affixing a third waveguide to the outer endface of the first lens on an opposite side of the first optical axis from the first waveguide.

47. An optical coupler device, comprising:
   a first lens having an outer endface and an inner endface with a first optical axis therethrough;
   a first waveguide on the outer endface of the first lens on one side of the first optical axis;
   a second lens having an outer endface and an inner endface with a second optical axis therethrough, the second lens translationally positioned with respect to the first lens such that the second optical axis is laterally offset from the first optical axis a predetermined distance, with the second optical axis being substantially parallel to the first optical axis;
   a second waveguide on the outer endface of the second lens on one side of the second optical axis; and
   a narrow bandpass optical filter disposed between the inner endface of the first lens and the inner endface of the second lens, the optical filter having channel spacings of about 100 GHz or less.

48. The optical coupler device of claim 47, wherein the first and second lenses are collimating gradient index lenses.

49. The optical coupler device of claim 47, further comprising a third waveguide on the outer endface of the first lens on an opposite side of the first optical axis from the first waveguide.

50. The optical coupler device of claim 49, wherein one or more of the first, second and third waveguides are tilted at a non-zero angle with respect to the first or second optical axes.

51. A method of fabricating an optical coupler device, comprising the steps of:
   providing a first lens having an outer endface and an inner endface with a first optical axis therethrough;
   providing a second lens having an outer endface and an inner endface with a second optical axis therethrough;
   positioning the first and second lenses in an offsetting translational relationship such that the second optical axis is laterally offset from the first optical axis a predetermined distance, with the second optical axis being substantially parallel to the first optical axis;
   positioning a narrow bandpass optical filter between the inner endface of the first lens and the inner endface of the second lens, the optical filter having channel spacings of about 100 GHz or less;
   affixing a first waveguide to the outer endface of the first lens on one side of the first optical axis; and
   affixing a second waveguide to the outer endface of the second lens on one side or the second optical axis.

* * * * *

UNITED STATES PATENT AND TRADEMARK OFFICE
CERTIFICATE OF CORRECTION

PATENT NO.   : 6,215,924 B1
DATED        : April 10, 2001
INVENTOR(S)  : C. Andrew Hulse, Robert E. Klinger and Robert B. Sargent It is certified that error appears in the above-identified patent and that said Letters Patent is hereby corrected as shown below:

Column 2,
Line 25, before "filter" change "100 GHz" to -- 100 Ghz --

Column 7,
Line 27, after "lenses 12 and" insert -- 22 --

Column 19,
Line 43, after "substantially" delete the comma

Column 20,
Line 65, before "the second" change "or" to -- of --

Signed and Sealed this

Ninth Day of April, 2002

Attest:

JAMES E. ROGAN
*Attesting Officer*      *Director of the United States Patent and Trademark Office*